US012773967B2

(12) United States Patent
Kaneko et al.

(10) Patent No.: US 12,773,967 B2
(45) Date of Patent: Oct. 27, 2026

(54) THRESHOLD SETTING DEVICE

(71) Applicant: TOYOTA JIDOSHA KABUSHIKI KAISHA, Toyota (JP)

(72) Inventors: Kazunori Kaneko, Miyoshi (JP); Yohei Ito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 19/053,571

(22) Filed: Feb. 14, 2025

(65) Prior Publication Data

US 2025/0289394 A1 Sep. 18, 2025

(30) Foreign Application Priority Data

Mar. 14, 2024 (JP) ................................ 2024-039990

(51) Int. Cl.

| | |
|---|---|
| ***B60R 25/24*** | (2013.01) |
| ***B60R 25/04*** | (2013.01) |
| ***G07C 9/00*** | (2020.01) |
| ***G07C 9/20*** | (2020.01) |
| ***H04B 17/318*** | (2015.01) |

(52) U.S. Cl.

CPC ............ *B60R 25/245* (2013.01); *B60R 25/04* (2013.01); *G07C 9/00309* (2013.01); *G07C 9/20* (2020.01); *H04B 17/318* (2015.01); *B60R 2325/205* (2013.01); *G07C 2009/00793* (2013.01); *G07C 2209/63* (2013.01)

(58) Field of Classification Search

CPC ..... H04B 17/318; B60R 25/245; B60R 25/04; B60R 2325/205; G07C 9/20; G07C 9/00309; G07C 2209/63; G07C 2009/00793

See application file for complete search history.

(56) References Cited

U.S. PATENT DOCUMENTS

| | | | | |
|---|---|---|---|---|
| 9,894,492 | B1 * | 2/2018 | Elangovan | H04W 4/023 |
| 11,256,248 | B2 * | 2/2022 | Maehara | G05D 1/0022 |
| 2022/0279335 | A1 * | 9/2022 | Fujii | B60R 25/24 |

FOREIGN PATENT DOCUMENTS

| | | | | | |
|---|---|---|---|---|---|
| DE | 112019006174 | T5 * | 9/2021 | | H04W 4/021 |
| JP | 2018115948 | A * | 7/2018 | | G01S 5/0284 |
| JP | 2019-060189 | A | 4/2019 | | |
| KR | 20230063769 | A * | 5/2023 | | G01S 11/06 |

* cited by examiner

*Primary Examiner* — Yong Hang Jiang

(74) *Attorney, Agent, or Firm* — SoraIP, Inc.

(57) ABSTRACT

When it is not determined that the execution device has detected the in-cabin mobile terminal, the execution device changes the threshold by a specified amount. Thereafter, when it is determined that the execution device detects the in-cabin mobile terminal and the execution device does not detect the external mobile terminal, the execution device ends the setting of the threshold. When the execution device detects the external mobile terminal after the process of changing the threshold to be small, the execution device changes the threshold to be larger than the value after the threshold is changed to be small. The execution device terminates the setting of the threshold after greatly changing the threshold.

5 Claims, 4 Drawing Sheets

THRESHOLD SETTING DEVICE

CROSS-REFERENCE TO RELATED APPLICATION

This application claims priority to Japanese Patent Application No. 2024-039990 filed on Mar. 14, 2024, incorporated herein by reference in its entirety.

BACKGROUND

1. Technical Field

The present disclosure relates to threshold setting devices.

2. Description of Related Art

A vehicle described in Japanese Unexamined Patent Application Publication No. 2019-060189 (JP 2019-060189 A) is equipped with an antenna. The antenna receives signals sent from a mobile terminal. When the strength of a signal received by the antenna from the mobile terminal is higher than a threshold, a detection device of the vehicle detects that the mobile terminal is present in a cabin of the vehicle.

SUMMARY

In the detection device as described in JP 2019-060189 A, when the threshold is set to be excessively high, the range for detecting the mobile terminal by the antenna becomes excessively narrow. Therefore, even if the mobile terminal is located in the cabin of the vehicle, the detection device may erroneously detect that the mobile terminal is not located in the cabin of the vehicle.

The present disclosure relates to a threshold setting device that sets a threshold of a detection device, the detection device being configured to detect that a mobile terminal is present in a cabin of a vehicle when strength of a signal from the mobile terminal received by an antenna mounted on the vehicle is equal to or higher than a threshold. The threshold setting device is configured to

- when the detection device does not detect an in-cabin mobile terminal located in the cabin, change the threshold to a value smaller than before the threshold is changed,
- when the detection device detects the in-cabin mobile terminal and does not detect an external mobile terminal located outside the cabin of the vehicle after the threshold is changed to the smaller value, finish changing a setting of the threshold,
- when the detection device detects the external mobile terminal after the threshold is changed to the smaller value, change the threshold to a value larger than the smaller value to which the threshold has been changed, and
- finish setting the threshold after the threshold is changed to the larger value.

The threshold setting device having the above configuration can reduce the possibility that the detection device may erroneously detect that the mobile terminal is not located in the cabin of the vehicle when the mobile terminal is located in the cabin of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

Hereinafter, an embodiment of a threshold setting device will be described. First, the vehicle 10 including the control device 50 that stores the threshold TH will be described.

Outline of Vehicle

Figure 1:
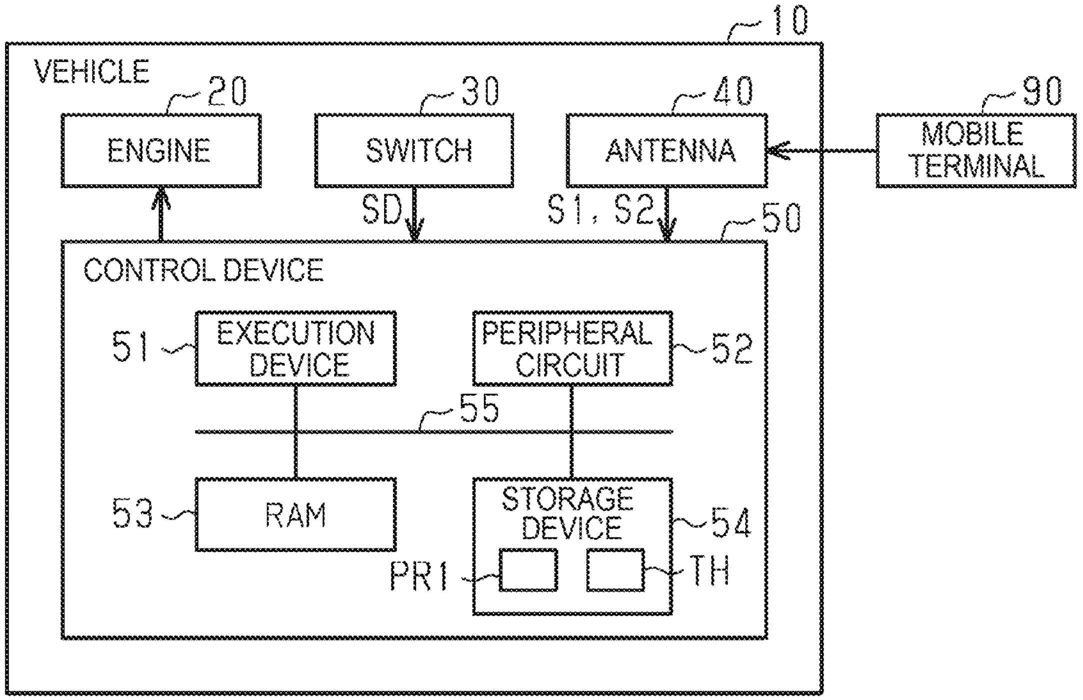
FIG. 1 is a schematic diagram showing a vehicle.

As illustrated in FIG. 1, the vehicle 10 includes an engine 20, a switch 30, an antenna 40, and a control device 50. The engine 20 is a drive device that drives the vehicle 10. The switch 30 is operated by a user to output a signal indicating a start-up request SD of the engine 20 to the control device 50.

The antenna 40 is mounted on the vehicle 10. The antenna 40 receives a signal transmitted from the mobile terminal 90. In the present embodiment, the mobile terminal 90 is a mobile phone having a digital key. Antenna 40 provides a strength signal SS indicative of the strength of the signal received from mobile terminal 90 to control device 50. The control device 50 obtains a signal indicating the start-up request SD from the switch 30. The control device 50 obtains the strength-signal SS from the antenna 40. The control device 50 controls the engine 20 based on the acquired signal.

The control device 50 includes an execution device 51 that is a CPU, peripheral circuit 52, a RAM 53, a storage device 54, and a bus 55. The bus 55 communicatively connects the execution device 51, the peripheral circuit 52, RAM 53, and the storage device 54 to each other. The peripheral circuit 52 includes a circuit that generates a clock signal that defines an internal operation, a power supply circuit, a reset circuit, and the like. RAM 53 stores data generated in association with the operation of the execution device 51. The storage device 54 stores a start control program PR1 of the engine 20 including a process of determining whether or not the mobile terminal 90 is present in the cabin, and data indicating a threshold TH to be used when the start control program PR1 is executed. The threshold TH is a value indicating the strength of a signal for determining whether the mobile terminal 90 is present in the cabin. In the present embodiment, the control device 50 is a detection device that detects that the mobile terminal 90 is present in the cabin. Series of processes for enabling the start of the drive device, including the detection of the mobile terminal The execution device 51 starts the execution of the start-up control program PR1 of the engine 20 when a signal indicating the start-up request SD is acquired from the switch 30.

Figure 2:
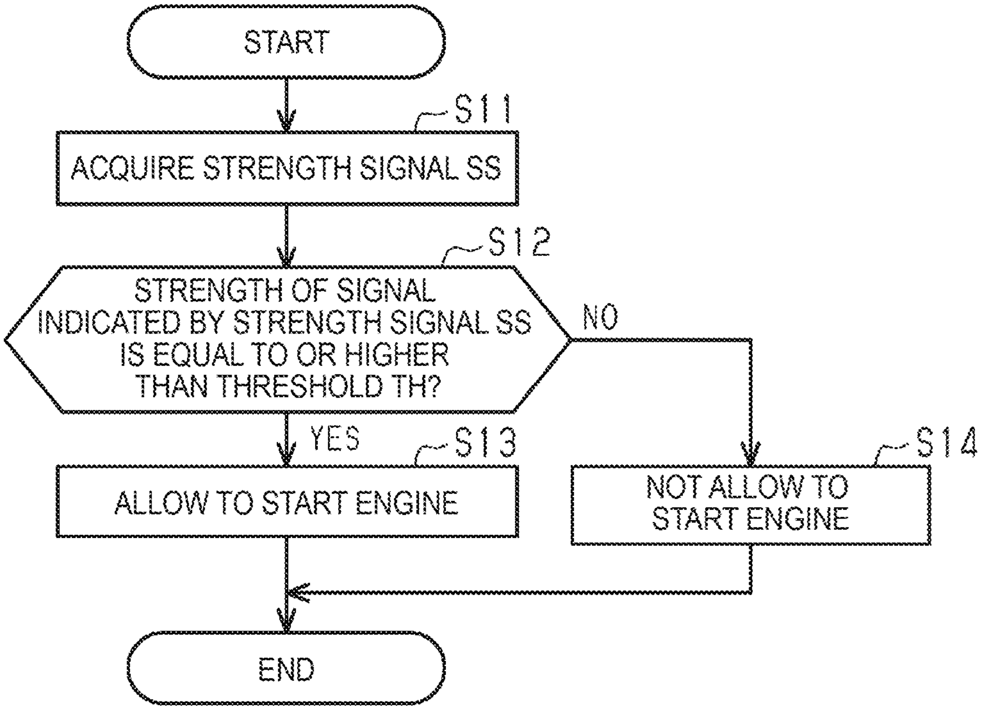
FIG. 2 is a flowchart illustrating a series of processes including detection of a mobile terminal of a control device.

As illustrated in FIG. 2, when the execution device 51 starts execution of the start control program PR1, the execution device 51 first performs a process of S11. In S11, the execution device 51 acquires strength-signal SS from the mobile terminal 90. Thereafter, the process proceeds to S12.

In S12, the execution device 51 determines whether or not the strength of the signal indicated by the strength signal SS is equal to or greater than the threshold TH. When the strength of the signal indicated by the strength signal SS is equal to or greater than the threshold TH (S12: YES), the execution device 51 detects that the mobile terminal 90 is present in the cabin of the vehicle 10, and advances the process to S13.

In S13, the execution device 51 permits the starting of the engine 20. That is, the execution device 51 permits the start of the vehicle 10 when it detects that the mobile terminal 90 is present in the cabin of the vehicle 10 when the switch 30 is operated to acquire the start-up request SD of the engine 20. Thereafter, the execution device 51 ends the series of processes.

On the other hand, when the strength of the signal indicated by the strength signal SS is less than the threshold TH (S12: NO), the execution device 51 advances the process to S14 without detecting that the mobile terminal 90 is present in the cabin of the vehicle 10. That is, in this case, the execution device 51 determines that the mobile terminal 90 is present outside the cabin of the vehicle 10.

In S14, the execution device 51 does not allow the starting of the engine 20. That is, the execution device 51 does not allow the start of the vehicle 10 because it does not detect that the mobile terminal 90 is present in the cabin of the vehicle 10 when the start of the engine 20 is requested by operating the switch 30. Thereafter, the execution device 51 ends the series of processes.

Threshold Setting System

Next, the setting system 100 for setting the threshold TH stored in the storage device 54 will be described.

Figure 3:
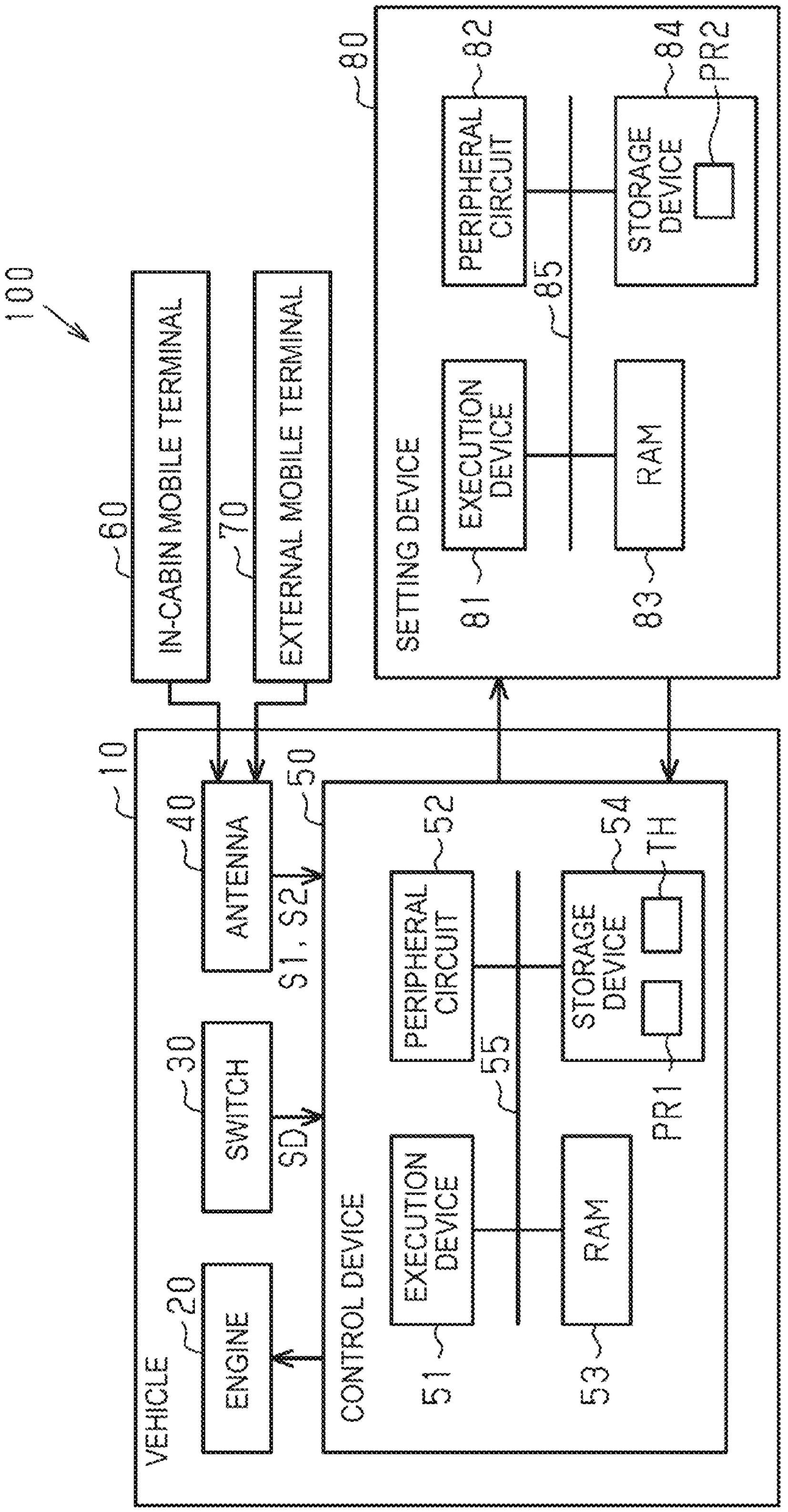
FIG. 3 is a schematic diagram illustrating a setting system including a setting device.

As illustrated in FIG. 3, the setting system 100 includes a vehicle 10, an in-cabin mobile terminal 60, an external mobile terminal 70, and a setting device 80. The in-cabin mobile terminal 60 is a mobile terminal 90 arranged at a predetermined in-cabin position P1 in the cabin of the vehicle 10. The external mobile terminal 70 is a mobile terminal 90 located at a predetermined external position P2 outside the cabin of the vehicle 10.

Figure 4:
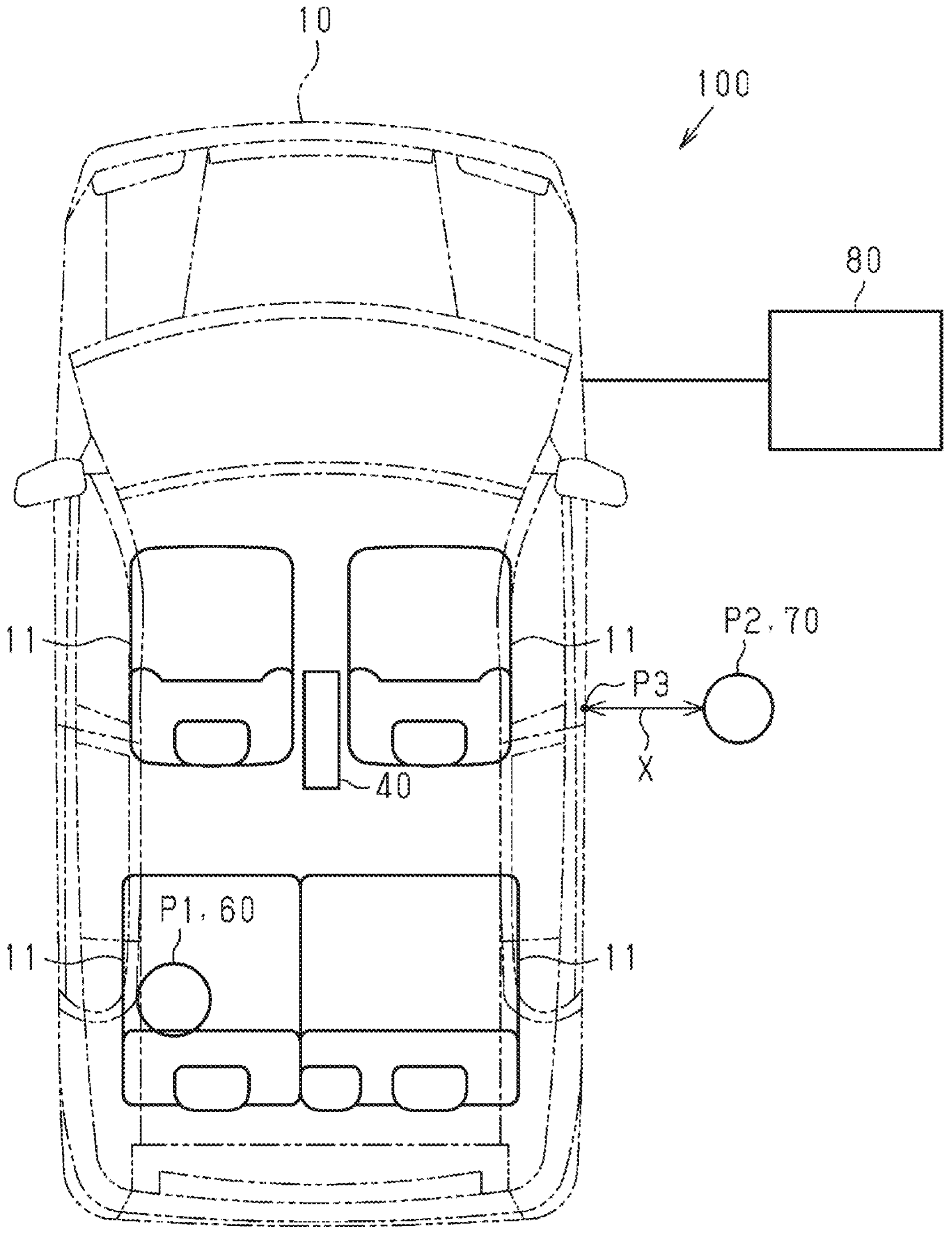
FIG. 4 is an explanatory view for explaining the positional relation in the setting system.

As illustrated in FIG. 4, the vehicle 10 includes four seats 11. When the vehicle 10 is viewed from above, the seats 11 are arranged in two rows, two seats in each row. The antenna 40 is located between the two seats 11 in the front row.

The in-cabin position P1 is located on the seat 11 farthest from the antennae 40 out of the four seats 11 when the vehicles 10 are viewed from above. Specifically, the in-cabin position P1 is located on one of the seats 11 in the rear row out of the four seats 11 in the rear row. Further, in the present embodiment, the in-cabin position P1 is a position near the end of the seat 11 that is farthest from the antennae 40. Therefore, the in-cabin mobile terminal 60 is located in the in-cabin position P1, which is farthest from the antennae 40 on the seat 11.

The external position P2 is located at a position outside the cabin of the vehicle 10 and away from the antenna 40 by an allowable distance X from a position P3 closest to the antenna 40 when the vehicle 10 is viewed from above. The allowable distance X is a distance outside the cabin of the vehicle 10 that is allowed to be detected to be in the cabin of the vehicle 10. Specifically, the external position P2 is a position separated from the front door by an allowable distance X. Therefore, the external mobile terminal 70 is located in the external position P2 that is separated from the front-door by the allowable distance X. That is, the external position P2 is a position closest to the antennae 40 out of positions that are not determined to be in the cabin.

As illustrated in FIG. 3, the antenna 40 receives a signal from the in-cabin mobile terminal 60. Antenna 40, the first strength signal S1 which is the strength of the signal received by the in-cabin mobile terminal 60 to the control device 50. The antenna 40 receives a signal from the external mobile terminal 70. Antenna 40, the second strength signal S2 which is the strength of the signal received by the external mobile terminal 70 to the control device 50.

The setting device 80 acquires the first strength signal S1 from the control device 50. The setting device 80 acquires the second strength signal S2 from the control device 50. The setting device 80 is connected to the control device 50 via a communication line.

The setting device 80 includes an execution device 81 that is a CPU, peripheral circuit 82, a RAM 83, a storage device 84, and a bus 85. The bus 85 communicatively connects the execution device 81, the peripheral circuit 82, RAM 83, and the storage device 84 to each other. The peripheral circuit 82 includes a circuit that generates a clock signal that defines an internal operation, a power supply circuit, a reset circuit, and the like. RAM 83 stores data generated in association with the operation of the execution device 81. The storage device 84 stores setting program PR2 for setting the threshold TH of the control device 50. The setting device 80 is, for example, a device used in a service by a dealer or the like.

Sequence of Operations Involving a Change in the Threshold

When an operation panel (not shown) of the setting device 80 is operated, the setting device 80 starts executing the setting program PR2. The setting device 80 starts executing the setting program PR2 and requests the in-cabin mobile terminal 60 and the external mobile terminal 70 to transmit a signal until the series of processes is completed. In addition, the setting device 80 starts executing the setting program PR2, and the control device 50 compares the first strength signal S1 and the second strength signal S2 with the thresholds TH to detect the in-cabin mobile terminal 60 and the external mobile terminal 70.

Figure 5:
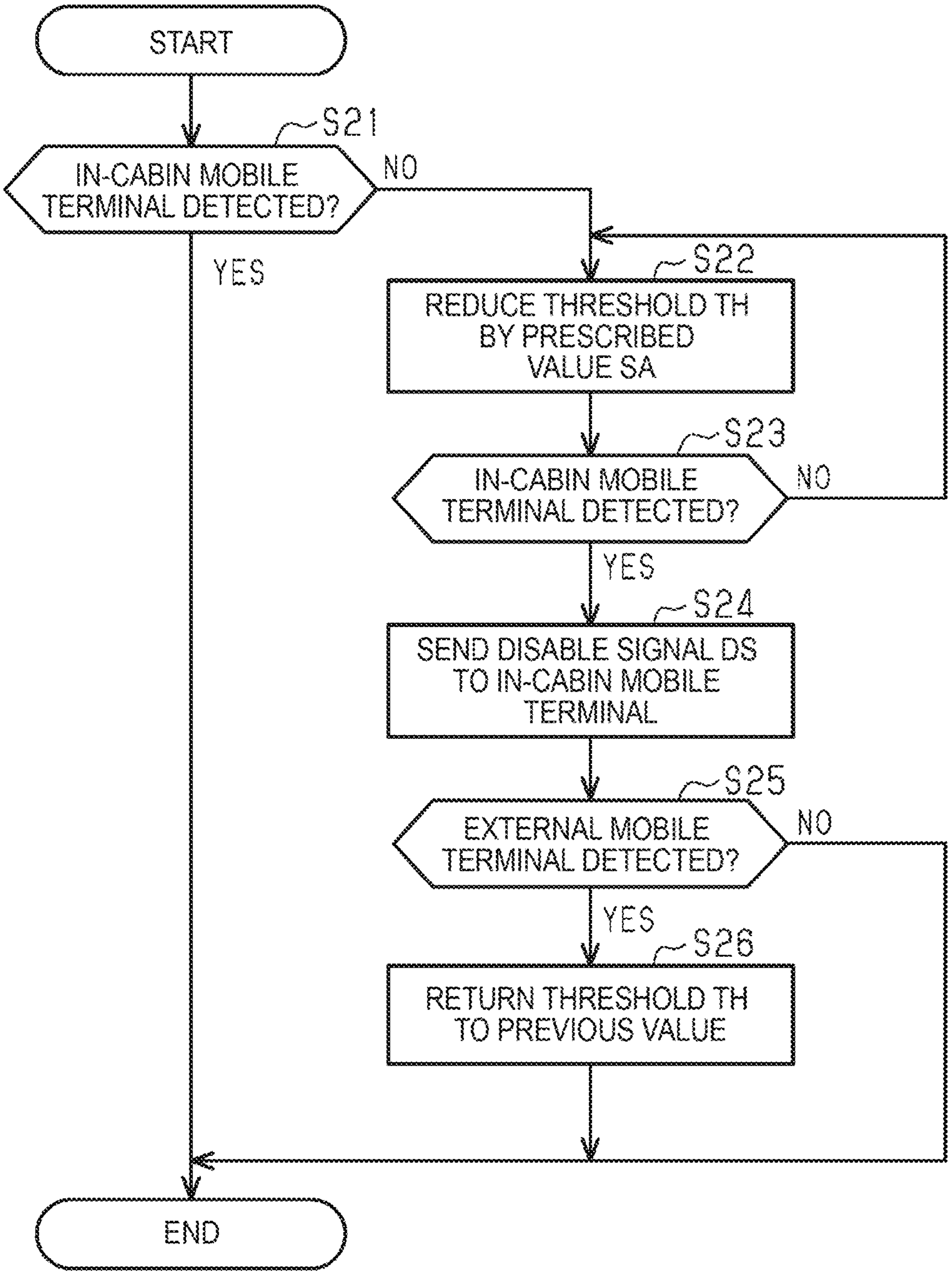
FIG. 5 is a flowchart illustrating a series of processes including a change in a threshold performed by the setting device.

As illustrated in FIG. 5, when the execution device 81 starts executing the setting program PR2, the execution device 81 starts S21 process. In S21, the execution device 81 determines whether or not the control device 50 has detected that the in-cabin mobile terminal 60 is present in the cabin of the vehicle 10. Specifically, when the execution device 81 acquires a signal indicating that the in-cabin mobile terminal 60 has been detected from the control device 50, it determines that the in-cabin mobile terminal 60 has been detected as being present in the cabin of the vehicle 10. When the first strength signal S1 is equal to or greater than the threshold TH, the control device 50 detects that the in-cabin mobile terminal 60 is present in the cabin of the vehicle 10. When the control device 50 detects the in-cabin mobile terminal 60 (S21: YES), the execution device 81 ends the series of processes.

On the other hand, when the control device 50 does not detect the in-cabin mobile terminal 60 (S21: NO), the execution device 81 advances the process to S22. In S22, the execution device 81 changes the threshold TH of the storage device 84 to be smaller by a predetermined specified amount SA. The specified amount SA is defined as, for example, the amount of the smallest units that can be changed. Thereafter, the execution device 81 advances the process to S23.

In S23, the execution device 81 determines whether or not the control device 50 has detected the in-cabin mobile terminal 60. Specifically, when the execution device 81 acquires a signal indicating that the in-cabin mobile terminal 60 has been detected from the control device 50, it determines that the in-cabin mobile terminal 60 has been detected as being present in the cabin of the vehicle 10. The control device 50 uses the threshold TH changed by S22 process to detect that the in-cabin mobile terminal 60 is present in the cabin of the vehicle 10 when the first strength signal S1 is equal to or larger than the threshold TH. When the control device 50 does not detect the in-cabin mobile terminal 60 (S23: NO), the execution device 81 returns the process to S22. That is, the execution device 81 changes the thresholds TH to be smaller by the specified amount SA again, and repeats S23 process.

On the other hand, when the control device 50 detects the in-cabin mobile terminal 60 (S23: YES), the execution device 81 advances the process to S24. In S24, the execution device 81 transmits the disable signal DS to the in-cabin mobile terminal 60. The disable signal DS is a signal indicating a demand for stopping transmitting a signal from the in-cabin mobile terminal 60. Thereafter, the execution device 81 advances the process to S25.

In S25, the execution device 81 determines whether the control device 50 has detected the external mobile terminal 70. Specifically, when the execution device 81 acquires a signal indicating that the external mobile terminal 70 has been detected from the control device 50, it determines that the external mobile terminal 70 has been detected as being present in the cabin of the vehicle 10. The control device 50 uses the threshold TH changed by S22 process to detect that the external mobile terminal 70 is present in the cabin of the vehicle 10 when the second strength signal S2 is equal to or larger than the threshold TH. When the control device 50 does not detect the external mobile terminal 70 (S25: NO), the execution device 81 ends the setting of the present threshold TH by ending the present series of processes.

On the other hand, when the control device 50 detects the external mobile terminal 70 (S25: YES), the execution device 81 advances the process to S26. In S26, the execution device 81 returns the value of the threshold TH to a value prior to changing the threshold TH to a small value by S22 in the series of processes. That is, the execution device 81 changes the threshold TH to a smaller value and then changes the threshold TH to a larger value than the value after the threshold TH is changed to a smaller value. Thereafter, the execution device 81 ends the current series of processes.

Operations of Embodiment

At the time of shipping of the vehicle 10, the threshold TH is set to be larger than the limit value so as not to erroneously detect that the mobile terminal 90 located outside the cabin of the vehicle 10 is present in the cabin of the vehicle 10 in view of variations etc. The threshold TH is set so that the external mobile terminal 70 is not detected. Some users of the vehicle 10 use the vehicle 10 by placing the mobile terminal 90 at a position in the cabin of the vehicle 10 and away from the antenna 40, such as in the in-cabin position P1. In such cases, the threshold TH is a value determined by the execution device 51 that neither the in-cabin mobile terminal 60 nor the external mobile terminal 70 is detected. With the threshold TH set in this way, the setting device 80 can change the threshold TH to a small value by executing the setting program PR2 by the setting system 100.

In the above-described embodiment, when the control device 50 does not detect the in-cabin mobile terminal 60 (S21: NO), the setting device 80 changes the threshold TH to be smaller than that before the change by S22. After S22 process, when the control device 50 does not detect the external mobile terminal 70 (S24: NO), the setting device 80 ends the setting change of the threshold TH. On the other hand, when the control device 50 detects the external mobile terminal 70 after S22 process (S24: YES), the setting device 80 returns S25 to the threshold TH prior to the change of S22. That is, the setting device 80 greatly changes the threshold TH to a threshold TH that does not detect the external mobile terminal 70. After S25, since the control device 50 does not detect the in-cabin mobile terminal 60 by returning the threshold TH, the setting device 80 ends the current series of processes.

Effects of Embodiment (1) According to the above-described embodiment, the setting device 80 changes the threshold TH set to be larger than the limit value to be smaller so that the control device 50 can detect the in-cabin mobile terminal 60. Thus, the setting device 80 can prevent the control device 50 from erroneously detecting that the mobile terminal 90 is not located in the cabin when the mobile terminal 90 is located in the cabin of the vehicle 10. On the other hand, the setting device 80 does not change the setting of the threshold TH so small that the control device 50 detects that the external mobile terminal 70 is present in the cabin. Accordingly, the setting device 80 can change the setting of the threshold TH to a small value within a range in which the external mobile terminal 70 is not erroneously determined as inside the cabin of the vehicle 10.

(2) According to the above embodiment, in the setting system 100, the external mobile terminal 70 is located at the external position P2 when the vehicle 10 is viewed from above. The external position P2 is a position outside the cabin of the vehicle 10 that is easily erroneously detected as in the cabin to a short distance from the antenna 40. Therefore, by reducing the threshold TH to the extent that it is not determined that the external mobile terminal 70 located in the external position P2 is present in the cabin of the vehicle 10, it is possible to prevent the threshold TH from being set excessively small.

(3) According to the above embodiment, in the setting system 100, the in-cabin mobile terminal 60 is located at the in-cabin position P1 when the vehicle 10 is viewed from above. The in-cabin position P1 is a position in the cabin of the vehicle 10 that is likely to be erroneously determined to be outside the cabin due to a long distance from the antenna 40. Therefore, the threshold TH is reduced until it is determined that the in-cabin mobile terminal 60 located at the in-cabin position P1 is present in the cabin of the vehicle 10. Thus, when the mobile terminal 90 is placed at a position closer to the antenna 40 than the in-cabin position P1 and the vehicle 10 is used, it is possible to suppress erroneous detection that the mobile terminal 90 is present in the cabin of the vehicle 10.

(4) According to the above-described embodiment, the setting device 80 transmits the disable signal DS to the in-cabin mobile terminal 60 by S24. Thus, even if the control device 50 cannot identify the mobile terminal 90 that is the source of the first strength signal S1 and the second strength signal S2, S25 can realize S25 process only by comparing the acquired one strength signal SS with the thresholds TH.

(5) In the above embodiment, the control device 50 permits the start of the engine 20 when it detects that the mobile terminal 90 is present in the cabin of the vehicle 10 when the switch 30 is operated to acquire the start-up request SD of the engine 20. According to the above-described embodiment, the setting device 80 changes the threshold TH to be small so long as it is not detected that the external mobile terminal 70 is present in the cabin of the vehicle 10. Therefore, it is possible to prevent the start of the engine 20 from being permitted even though the mobile terminal 90 is present outside the cabin of the vehicle 10.

Other Embodiments

The present embodiment can be realized with the following modifications. The present embodiment and the following modifications can be combined with each other within a technically consistent range to be realized.

- The drive device is not limited to the engine 20. For example, the drive device may be a motor.
- In the above embodiment, the detection device is the control device 50, but the present disclosure is not limited thereto. The detection device may be provided separately from the control device 50. In this case, the detection device may not control the start of the engine 20. That is, the detection device may detect that the mobile terminal 90 is present in the cabin of the vehicle 10 by using the strength signal SS and the threshold TH.
- The execution device 81 may omit S24 process. When the control device 50 can distinguish the source of the first strength signal S1 and the second strength signal S2, the control device 50 can detect that the external mobile terminal 70 is present in the cabin of the vehicle 10 even if S24 process is omitted.
- After S25 process, the execution device 81 may perform S25 process again. Then, when the external mobile terminal 70 is not detected, the execution device 81 may end the series of processes. In this case, the setting device 80 can avoid setting a threshold TH for erroneously detecting that the external mobile terminal 70 is present in the cabin.
- The in-cabin position P1 is not limited to the exemplary embodiment described above. For example, it may be located rearward of all the seats 11 in the cabin of the vehicle 10. Further, for example, it may be on an instrument panel in the cabin of the vehicle 10.
- The external position P2 is not limited to the exemplary embodiment described above. For example, it may be a position P3 outside the cabin of the vehicle 10 and closest to the antennae 40.
- The mobile terminal 90 may be an electronic key.
- The setting device 80 may be configured as a circuitry including one or more processors that execute various processes in accordance with a computer program (software). Note that the setting device 80 may be configured as a circuit including one or more dedicated hardware circuits, such as an application-specific integrated circuit (ASIC), or a combination thereof, for executing at least some of various processes. The processor includes a CPU and a memory such as a random access memory (RAM) and a ROM. The memory stores a program code or an instruction configured to execute the CPU to perform processes. The memory, that is, the computer-readable medium includes any available media that can be accessed by a general purpose or special purpose computer.

What is claimed is:

1. A threshold setting device that sets a threshold of a detection device, the detection device being configured to detect that a mobile terminal is present in a cabin of a vehicle when strength of a signal from the mobile terminal received by an antenna mounted on the vehicle is equal to or higher than a threshold, the threshold setting device being configured to when the detection device does not detect an in-cabin mobile terminal located in the cabin, change the threshold to a value smaller than before the threshold is changed, when the detection device detects the in-cabin mobile terminal and does not detect an external mobile terminal located outside the cabin of the vehicle after the threshold is changed to the smaller value, finish changing a setting of the threshold, when the detection device detects the external mobile terminal after the threshold is changed to the smaller value, change the threshold to a value larger than the smaller value to which the threshold has been changed, and finish setting the threshold after the threshold is changed to the larger value.

2. The threshold setting device according to claim 1, wherein the external mobile terminal is located at a position outside the cabin and away from the antenna by an allowable distance allowed from a position closest to the antenna, when the vehicle is viewed from above.

3. The threshold setting device according to claim 1, wherein the in-cabin mobile terminal is located on a seat farthest from the antenna out of seats of the vehicle, when the vehicle is viewed from above.

4. The threshold setting device according to claim 1, wherein the threshold setting device is further configured to, when the detection device detects the in-cabin mobile terminal after the threshold is changed to the smaller value, send to the in-cabin mobile terminal a request to stop transmission of the signal.

5. The threshold setting device according to claim 1, wherein the detection device is configured to, when a switch of the vehicle is operated to request to start a drive device of the vehicle, allow to start the drive device upon detection of the mobile terminal being present in the cabin.

* * * * *